United States Patent [19]

Metten

[11] Patent Number: 5,400,561
[45] Date of Patent: Mar. 28, 1995

[54] CONCRETE BLOCKS HAVING THROUGH HOLES FOR WATER DRAINAGE

[75] Inventor: Josef Metten, Bergisch Gladbach, Germany

[73] Assignee: Metten Produktions-und-Handel GmbH, Overath, Germany

[21] Appl. No.: 161,510

[22] Filed: Dec. 6, 1993

[30] Foreign Application Priority Data

Dec. 9, 1992 [DE] Germany ............... 42 41 414.8

[51] Int. Cl.⁶ ............................................. E04C 2/04
[52] U.S. Cl. ..................................... 52/606; 52/607; 52/232; 52/745.19; 405/19
[58] Field of Search ............ 52/606, 607, 98, 99, 52/232, 745.19; 404/44, 49, 66, 67, 69

[56] References Cited

U.S. PATENT DOCUMENTS 2,706,109  4/1955  Ödman ........................ 52/606
3,099,063  7/1963  Santhany ..................... 52/607
3,923,410  12/1975  Jordan et al. ............... 52/606

Primary Examiner—Carl D. Friedman
Assistant Examiner—Christopher Todd Kent
Attorney, Agent, or Firm—Charles L. Schwab

[57] ABSTRACT

In the case of concrete blocks having narrow through holes for water drainage (perforated blocks), in particular paving stones of various formats and sizes that can be laid on surfaces exposed to the rain, such as streets, paths, squares, parking areas and rings around planted trees, and can be filled by means of jointing means or by means of sand at the lateral ends, the problem exists that the holes become plugged upon jointing or sanding-in. In order to prevent this, the holes are closed at their top end until the jointing or sanding-in operation is complete. This is advantageously accomplished by means of a filling agent that can be floated away or dissolves by means of the addition of water.

20 Claims, 3 Drawing Sheets

CONCRETE BLOCKS HAVING THROUGH HOLES FOR WATER DRAINAGE

TECHNICAL FIELD

This invention relates to concrete blocks having narrow through holes for water drainage (perforated blocks), in particular paving stones of various formats and sizes that can be laid on surfaces exposed to the rain, such as streets, paths, squares, parking areas and rings around planted trees, and can be filled up to the lateral edges with jointing means.

BACKGROUND OF THE INVENTION

Perforated blocks of the stated type are known, for example, as shown in German Gebrauchsmuster (German Utility Model) 72 45 452 and German patent DE-37 19 245 A1. By means of the holes of the perforated blocks, rainwater can drain off in advantageous fashion without pools and undesired water surfaces forming. Above all, however, the rainwater is to seep into the subsoil and be led to the groundwater instead of flowing into the sewerage. An important point is that the size of the holes must not be so large that problems arise in walking on the surfaces. For example, heels of ladies' shoes must not get caught in the holes. For this reason, the holes should have a diameter of approximately 5 to 20 mm. Perforated blocks of this type must not be confused with blocks that have large openings into which earth is poured (lawn checker bricks and so forth) so that the surfaces will be greened.

Initially, it was attempted to lay such perforated blocks without jointing or sanding-in the blocks, in order to prevent the holes being filled with sand during jointing so as to threaten the drainage of water. This has, however, proved unfavorable because the blocks are not firmly enough supported one against another and the perforated blocks do not sit solidly enough when the surfaces are under load, for example when the surfaces are walked on.

OBJECTS AND SUMMARY OF THE INVENTION

It is therefore an object of the invention to modify the perforated blocks in such fashion that jointing or sanding-in is possible without the drainage holes also becoming jointed or filled with sand. The object of the invention is achieved by virtue of the fact that the holes are closed at least at their top end and during the jointing process. By this means it is insured that the perforated blocks, as formerly usual, can be laid and sanded-in or jointed without sand or jointing material getting into the holes and thereby preventing the drainage of water. After laying and final jointing or sanding-in, the holes are opened so that the full functionality of the holes is insured.

The closure of the holes is advantageously accomplished by means of a filling agent that later becomes flowable by means of the addition of water. The filling agent can, as proposed, contain a mass that is plastically deformable after the addition of water, then solidifies and is liquefied by means of the addition of water. The mass is, for example, starch, preferably grain or wheat starch, or sugar, for example in the form of syrup or molasses, or flour, for example grain or potato flour. Additionally, as proposed, the filling agent contains sand, in fine form, for example as quartz sand or powdered quartz. It is important that such materials be environmentally compatible and cause no damage to the subsoil and groundwater.

Advantageously, therefore, the mass consists essentially of starch or sugar, as already mentioned, sand admixed and made up with water until a paste is formed. This paste is applied to the ends of the holes, so that the top ends of the holes are closed. The application can advantageously take place directly after the molding of the concrete blocks or after setting. The filling agent in paste form can then be solidified or hardened by means of the removal of water. The paving blocks are packaged after they have been dried, care being taken, in the case of the perforated blocks that have been treated with the above described filling agent, that the packaging is tight against wetness or rainproof. Afterward, as usual, the concrete blocks are laid at the construction site, sanded-in or jointed, compacted by means of a vibrator if necessary, and then sprayed with water. The mass contained in the filling agent, for example the starch, thereupon turns to a liquid, so that the filling agent is washed away and the ends of the holes become free. The water spraying can be dispensed with, because rain also effects liquefaction in a short time. The sand added to the filling agent as quartz sand or powdered quartz does not have a negative action because it is so fine and represents such a small quantity that it can escape through the holes if necessary.

The closure of the holes can also be accomplished by means of adhesive strips above the ends of the holes, or by means of plugs adapted to the holes, said plugs being attached to strips for better removal. The adhesive strips or the plug strips can be self-adhesive strips and can also be reinforced by means of fibers, for example by means of glass fibers. The material of the adhesive strips can also consist of a material that dissolves in water, so that it can be floated away similarly to the filling agent. The adhesive strips or the plug strips naturally also fulfill the object and solve the problem of plugging the holes during laying, but they are not so simple in handling—aside from the soluble adhesive strips—because they must be removed after the laying of the concrete blocks has been completed.

The closure of the holes can also be accomplished by means of a filling material that is plastically deformable upon application and hardens afterward. This can be a permanently elastic jointing material that contains silicone or the like, or loam or clay masses. These become hard or solid after the removal of water or after hardening and can thus be easily removed or scraped off.

In accordance with the invention, the filling agent is applied by means of nozzles or nozzle heads, either as a pile on the ends of the holes or as strips over the rows of holes, and then leveled. The leveling is not an operation that must always be carried out; it is advantageous if the concrete blocks are also designed flat on their bottom side, so that after leveling, in the case of concrete blocks offset relative to one another, no closure of the holes on the bottom side takes place. Leveling can advantageously be carried out by rolling, troweling and the like.

The nozzle heads can be mounted on a machine that is designed in correspondence to a robot, so that automatic application of the filling agent takes place. The nozzles can also be automatically controlled via valves.

Depending on the working procedure, it may be advantageous if the filling agent is subjected to a heat treatment after application and after leveling, if applicable.

BRIEF DESCRIPTION OF THE DRAWINGS

For the further explanation of the invention, reference is made to the Drawings, in which exemplary embodiments of the invention are illustrated in simplified form.

DETAILED DESCRIPTION OF THE DRAWINGS

Figure 1:
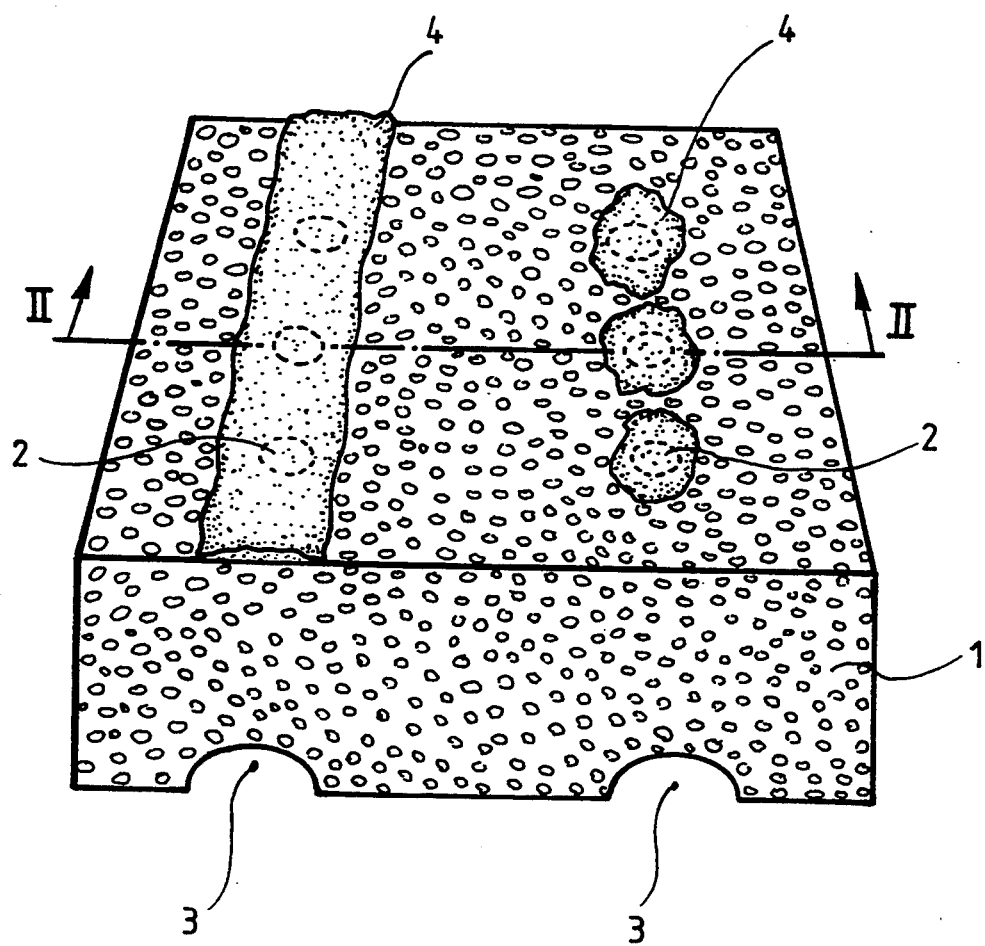
FIG. 1 shows a perspective view of a concrete block in accordance with the invention, having holes whose upper ends are closed by means of filling agent.
Figure 2:
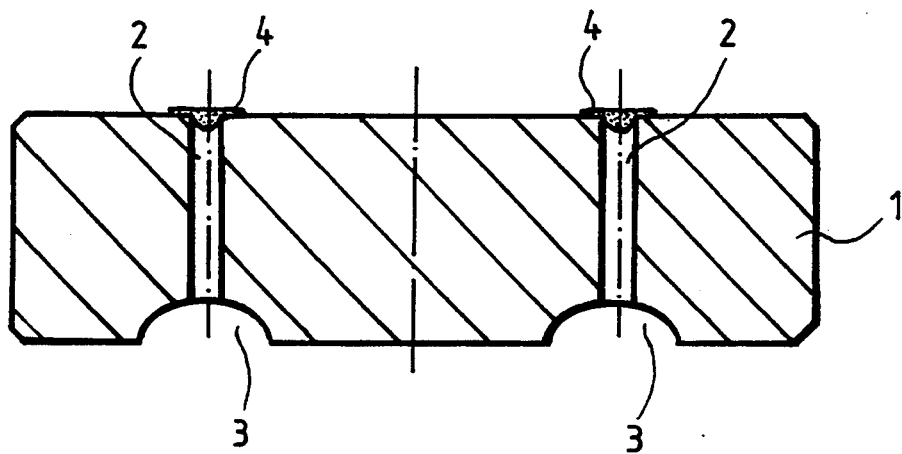
FIG. 2 shows a section through the concrete block of FIG. 1, in which, however, the filling agent has been leveled.
Figure 3:
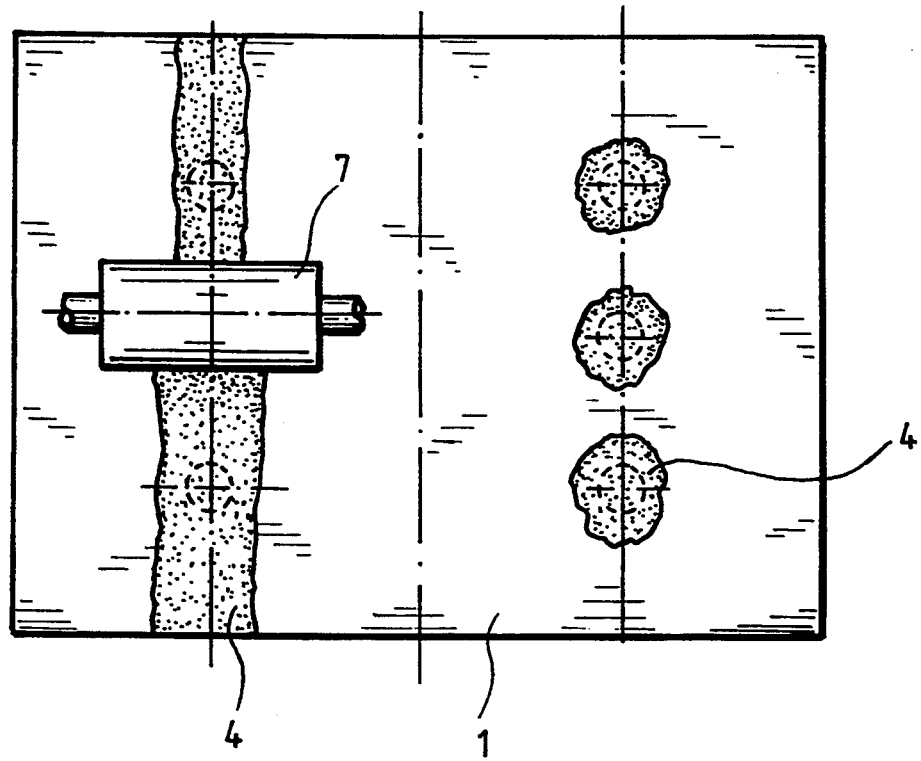
FIG. 3 shows a view looking down on a concrete block in accordance with FIG. 1, in which a roller for the leveling of the filling agent is shown.
Figure 4:
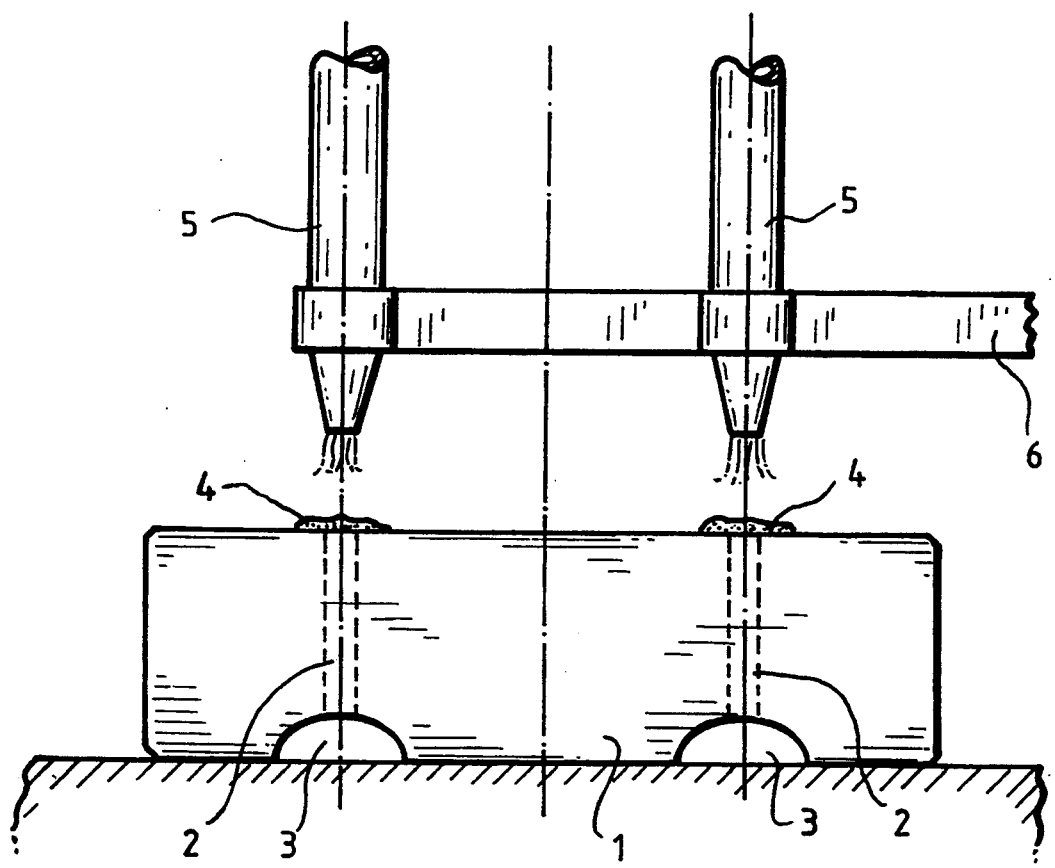
FIG. 4 shows a section through the paving block of FIG. 2, in which nozzles having a mounting for the application of the filling agent are additionally illustrated.

In FIGS. 1 to 4, insofar as shown in detail, 1 denotes a concrete block, which exhibits through holes 2 extend downwardly through the block 1 and open into an arched recess 3 made on the bottom side of concrete block 1. The top ends of the holes 2 are closed with a water soluable filling agent 4, which is applied by means of nozzles 5, which are mounted and guided on a mounting 6. The nozzles 5 and the mounting 6 are, as not shown in detail, automatically controlled in correspondence to a robot, so that the filling agent 4 can be applied exactly and at a high rate to the upper ends of the vertical holes 2. As shown in FIG. 3, the filling agent 4 can be leveled by means of a roller 7 after application. Naturally, another tool, for example a trowel, can be employed in place of a roller 7. In FIG. 2 it is shown that the filling agent 4 occupies only a minimal volume after its leveling, so that the bottom ends of the holes 2 are not plugged by the filling agent 4 even in the case of concrete blocks 1 that exhibit no channel 3 arranged at the bottom end of the holes 2.

After the blocks 1 are laid in place and sanded in or jointed by jointing means, the blocks may be washed off thereby dissolving the water soluable filling agent which liquefies and flows away.

What is claimed is:

1. A concrete block having a plurality of narrow vertical through holes permitting water drainage therethrough and being suitable for use as paving stones which are installed with jointing means between the stones, said concrete block comprising:
   a water soluable filling agent (4) in the upper ends of said through holes, said filling agent (4) becoming flowable upon the addition of water.

2. The concrete block of claim 1 wherein said filling agent (4) contains a mass that is plastically deformable after the addition of water.

3. The concrete block of claim 1 wherein said filling agent (4) contains starch.

4. The concrete block of claim 1 wherein said filling agent (4) contains flour.

5. The concrete block of claim 1 wherein said filling agent (4) contains sugar.

6. The concrete block of claim 1 wherein said filling agent (4) contains fine sand.

7. The concrete block of claim 1 wherein said filling agent (4) is a paste of a mixture of starch, fine sand and water.

8. The concrete block of claim 1 wherein said filling agent (4) is a paste of a mixture of sugar, fine sand and water.

9. The concrete block of claim 1 wherein said filling agent (4) is a paste of a mixture of flour, fine sand and water.

10. A concrete block having a plurality of narrow vertical through holes permitting water drainage therethrough and being suitable for use as paving stones which are laid with jointing means between the stones, said concrete block comprising:
    temporary closure means on top of said block closing the upper end of said through holes.

11. The concrete block of claim 10 wherein said temporary closure means includes plastic strips.

12. The concrete block of claim 10 wherein said temporary closure means includes hole plugs attached to strips.

13. The concrete block of claim 12 wherein said hole plugs are made of a flexible plastic.

14. The concrete block of claim 10 wherein said temporary closure means includes a filling material which is plastically deformable upon application to the top of said concrete block and hardens after application.

15. The concrete block of claim 14 wherein said filling material is a permanently elastic jointing material.

16. The concrete block of claim 15 wherein said permanently elastic jointing material contains silicone.

17. A method of making a concrete block suitable for use as a paving stone comprising the steps of:
    forming a concrete block with a plurality of vertical through holes permitting water drainage therethrough,
    closing the upper ends of said holes by application of a water soluable filling agent to the upper ends of said holes, and
    drying said filling agent.

18. The method of claim 17 wherein said filling agent is leveled prior to its being dryed.

19. The method of claim 17 wherein said filling agent is applied by a plurality of nozzles.

20. The method of claim 17 wherein said filling agent is applied by a plurality of nozzles and said filling agent is leveled prior to its being dryed.

* * * * *